United States Patent
Sundell et al.

(10) Patent No.: US 9,896,527 B2
(45) Date of Patent: Feb. 20, 2018

(54) HIGHLY SELECTIVE POLYNORBORNENE HOMOPOLYMER MEMBRANES FOR NATURAL GAS UPGRADING

(71) Applicant: Saudi Arabian Oil Company, Dhahran (SA)

(72) Inventors: Benjamin J. Sundell, Boston, MA (US); John A. Lawrence, III, Medford, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/057,894

(22) Filed: Mar. 1, 2016

(65) Prior Publication Data

US 2017/0253679 A1    Sep. 7, 2017

(51) Int. Cl.

| | | |
|---|---|---|
| C08F 132/08 | (2006.01) | |
| C08F 132/04 | (2006.01) | |
| C08F 8/12 | (2006.01) | |
| B01D 53/22 | (2006.01) | |
| B01D 71/70 | (2006.01) | |
| C08G 61/08 | (2006.01) | |
| B01D 67/00 | (2006.01) | |
| B01D 71/44 | (2006.01) | |
| B01D 71/72 | (2006.01) | |
| C08F 4/80 | (2006.01) | |

(52) U.S. Cl.
CPC .......... C08F 132/08 (2013.01); B01D 53/228 (2013.01); B01D 67/0009 (2013.01); B01D 71/70 (2013.01); B01D 2053/221 (2013.01); B01D 2323/30 (2013.01)

(58) Field of Classification Search
CPC .......... C08F 8/12; C08F 132/04; C08G 61/08; B01D 71/44; B01D 71/70; B01D 71/72
USPC ...................................................... 525/326.5
See application file for complete search history.

(56) References Cited

U.S. PATENT DOCUMENTS

| | | |
|---|---|---|
| 6,031,058 A | 2/2000 | McIntosh, III et al. |
| 6,093,779 A | 7/2000 | Van Der Schaaf et al. |
| 6,121,340 A | 9/2000 | Shick et al. |
| 6,639,021 B2 * | 10/2003 | Oshima ................. C08G 61/08 |
| | | 428/428 |
| 7,504,699 B1 | 3/2009 | Kohl et al. |
| 7,919,025 B2 | 4/2011 | Ramaswamy et al. |
| 8,043,418 B2 | 10/2011 | Ruud et al. |
| 8,678,203 B2 | 3/2014 | Knapp et al. |
| 2008/0134895 A1 | 6/2008 | Ruud et al. |
| 2010/0190950 A1 | 7/2010 | Tetsuka et al. |
| 2015/0018480 A1 | 1/2015 | Hartmann |

FOREIGN PATENT DOCUMENTS

| | | |
|---|---|---|
| WO | 2015070288 A1 | 5/2015 |
| WO | 2015134095 A1 | 9/2015 |

OTHER PUBLICATIONS

Baker et al., "Natural Gas Processing with Membranes: An Overview", Industrial & Engineering Chemistry Research, 2008, 2109-2121, 47, American Chemical Society.
Bermeshev et al., "Glassy Polynorbomenes with Si—O—Si Containing Side Groups. Novel Materials for Hydrocarbon Membrane Separation", Macromolecules, 2013, 8973-8979, 46, American Chemical Society.
Cunico, R. F., "The Diels-Alder Reaction of a, b-Unsaturated Trihalosilanes with Cyclopentadiene", Journal of Organic Chemistry, 1971, 929-932, 36-7.
Dettmer et al., "Synthesis and Functionalization of ROMP-Base Gradient Copolymers of 5-Substituted Norbornenes", Macromolecules, 2004, 5504-5512, 37, American Chemical Society.
Dorkenoo et al., "Gas Transport Properties of a Series of High Tg Polynorbomenes with Aliphatic Pendant Groups", Journal of Polymer Science, 1998, 797-803, 36.
Finkelshtein et al., "Substituted Polynorbornenes as Promising Materials for Gas Separation Membranes", Russian Chemical Reviews, 2011, 341-361, 80 (4).
Finkelshtein et al., "Synthesis and Gas Permeation Properties of New ROMP Polymers from Silyl Substituted Norbornadienes and Norbornenes", Polymer, 2003, 2843-2851,44.
Finkelshtein et al., "Ring-opening Metathesis Polymerization of Norbornenes with Organosilicon Substituents. Gas Permeability of Polymers Obtained", Makromol. Chem., 1991, 1-9, 192.
Finkelshtein et al., "Addition-Type Polynorbornenes with Si(CH3)3 Side Groups: Synthesis, Gas Permeability, and Free Volume", Macromolecules, 2006, 7022-7029, 39, American Chemical Society.
Finkelshtein et al., "Addition Polymerization of Silyl-Containing Nobornenes in the Presence of Ni-Based Catalysts", Journal of Molecular Catalysis A: Chemical, 2006, 9-13, 257.
Finkelshtein et al., "Addition Poly(trimethylsilylnorbornene) and its Gas Transporting Characteristics", Physical Chemistry, 2006, 88-90, 407.

(Continued)

*Primary Examiner* — Fred M Teskin
(74) *Attorney, Agent, or Firm* — Dinsmore & Shohl LLP

(57) ABSTRACT

Embodiments for a crosslinked alkoxysilyl polynorbornene homopolymer and methods of making crosslinked alkoxysilyl polynorbornene homopolymer are provided, where the method comprises polymerizing through addition polymerization or ring opening metathesis polymerization a norbornene monomer comprising an alkoxysilyl moiety in the presence of a catalyst to produce an alkoxysilyl modified polynorbornene homopolymer, and producing a crosslinked alkoxysilyl polynorbornene homopolymer through sol-gel initiated crosslinking of the alkoxysilyl modified polynorbornene homopolymer at ambient conditions, or acid-catalyzed conditions.

18 Claims, 5 Drawing Sheets

(56) References Cited

OTHER PUBLICATIONS

Floros et al., "Ring Opening Metathesis Polymerization of Norbornene and Derivatives by the Triply Bonded Ditungsten Complex Na[W2(u-Cl)3Cl4(THF)2]*(THF)3", Polymers, 2012, 1657-1673, 4.
Galizia et al., "Sorption of Hydrocarbons and Alcohols in Addition-Type Poly(Trimethyl Silyl Norbornene) and Other High Free Volume Glassy Polymers", Journal of Membrane Science, 2012, 201-211, 405-406.
Grinevich et al., "Membrane Separation of Multicomponent Mixture of Alkanes C1-C41", Polymer Science, 2013, 43-47, 55, Pleiades Publishing.
Grove et al., "Functionalized Polynorborne Dielectric Polymers: Adhesion and Mechanical Properties", Journal of Polymer Science, 1999, 3003-3010, 37, John Wiley & Sons, Inc.
Hennis et al., "Novel, Efficient, Palladium-Based System for the Polymerization of Norbornene Derivatives: Scope and Mechanism", Organometallics, 2001, 2802-2812, 20, American Chemical Society.
Janiak et al., "The Vinyl Homopolymerization of Norbornene", Macromolecular Rapid Communications, 2001, 479-492, 22, Wiley-VCH Verlag GmbH.
Kaita et al., "Cyclopentadienyl Nickel and Palladium Complexes/Activator System for the Vinyl-Type Copolymerization of Nobornene with Norbornene Carboxylic Acid esters: Control of Polymer Solubility and Glass Transition Temperature", Macromolecular Rapid Communications, 2006, 1752-1756, 27, Iley-VCH Verlag GmbH.
Katsumata et al., "Synthesis and Properties of Polynorbornenes Bearing Oligomeric Siloxane Pendant Groups", Polymer, 2009,1389-1394, 50, Elsevier Ltd.
Lipian et al., "Addition Polymerization of Norbornene-Type Monomers. High Activity Cationic Allyl Palladium Catalysts", Macromolecules, 2002, 8969-8977, 35, American Chemical Society.
Makovetsky et al., "Ring-Opening Metathesis Polymerization of Substituted Norbornenes", Journal of Molecular catalysis, 1992, 107-121, 76, Elsevier Sequoia.
Shishatskii et al., "Effects of Film Thickness on Density and Gas permeation Parameters of Glassy Polymers", Journal of Membrane Science, 1996, 275-285, 112, Elsevier Science B.V.
Starannikova et al., Addition-Type Polynorbornene with Si(CH3)3 Side Groups: Detailed Study of Gas permeation and Thermodynamic Properties, Journal of Membrane Science, 2008, 134-143, 323, Elsevier B.V.
Tetsuka et al., "Synthesis and Properties of Addition-Type Poly(norbornene)s with Siloxane Substituents", Polymer Journal, 2009,643-649,41 (8), The Society of Polymer Science, Japan.
Tetsuka et al., "Addition-type Poly(norbornene)s with Siloxane Substituents: Synthesis, Properties and Nanoporous Membrane", Polyer Journal, 2011, 97-100, 43, The Society of Polymer Science, Japan.
Walter et al., "Vinyl Addition Polymerization of Norbornene with Cationic (allyl)Ni Catalysts: Mechanistic Insights and Characterization of First Insertion Products", Journal of Polym. Science Part A: Polym Chem., 2009, 2560-2576, 47.
Walter et al., "y-Agostic Species as Key Intermediates in the Vinyl Addition Polymerization of Norbornene with Cationic (allyl)Pd Catalysts: Synthesis and Mechanistic Insights", Journal of American Chemical Society, 2009, 9055-9069, 131.
Yampolskii et al., "Polymeric gas Separation Membranes", Macromolecules, 2012, 3298-3311, 45, American Chemical Society.
Yampolskii et al., Addition-Type Polynorbornene with Si(CH3)3 Side Groups: Detailed Study of Gas Permeation, Free Volume and Thermodynamic Properties, Membrane Gas Separation, 43-57.
Yampolskii et al., "Solubility Controlled Permeation of Hydrocarbons: New Membrane Materials and Results", Journal of Membrane Science, 2014, 532-545, 453, Elsevier.
Zhao et al., "Structural Characteristics and Gas Permeation Properties of Polynorbornenes with retained Bicyclic Structure", Polymer, 2001, 2455-2462, 42, Elsevier Science Ltd.
Zhao et al., "Synthesis, Molecular Structures, and Norbornene Addition Polymerization Activity of the Neutral Nickel Catalysts Supported by b-Diketiminato [N, N], Ketiminato [N, O], and Schiff-Base [N, O] Ligands", Organometallics, 2004, 3270-3275, 23, American Chemical Society.
Search Report pertaining to International Application No. PCT/US2017/018695 dated May 11, 2017.
Bermeshev et al., "Synthesis of High Molecular Weight Poly[3-{tris(trimethylsiloxy)silyl}tricyclononenes-7] and Their Gas Permeation Properties", American Chemical Society, vol. 44, No. 17, Sep. 13, 2011.
Saunders et al., "Enginneered Monodisperse Mesoporous Materials", Sandia National Laboratories, Sandia Report, SAND97-2027 UC-701, pp. 1-33, Aug. 1, 1997.
Dragutan et al., "Synthesis of Metal-containing Polymers via Ring Opening Metathesis Polymerization (ROMP). Part I. Polymers Containing Main Group Metals", J. Inorg Organomet Polym, vol. 18, No. 1, pp. 18-31, Nov. 30, 2007.
Gmernicki et al., "Accessing Siloxane Functionalized Polynorbornenes via Vinyl-Adition Polymerization for CO2 Separation Membranes", ACS Macro Letters, vol. 5, No. 7, Jul. 19, 2016.
Sundell et al., "Alkoxysiyl functionalized polynorbornenes with enhanced selectivity for heavy hydrocarbon separations", RSC Advances: An International Journal to Further the Chemical Sciences, vol. 6, No. 57, May 20, 2016.
Vaughn et al., "Reverse selective glassy polymers for C3+ hydrocarbon recovery from natural gas", Journal of Membrane Science, vol. 522, pp. 68-75, Sep. 8, 2016.

* cited by examiner

HIGHLY SELECTIVE POLYNORBORNENE HOMOPOLYMER MEMBRANES FOR NATURAL GAS UPGRADING

TECHNICAL FIELD

Embodiments of the present disclosure generally relate to norbornene homopolymer membranes and their ability to separate natural gas molecules.

BACKGROUND

The natural gas used by consumers is composed almost entirely of methane. However, natural gas found at the wellhead, although still composed primarily of methane, is by no means as pure. Natural gas is typically isolated from three different sources: oil wells, gas wells and condensate well, but whatever the source of the natural gas, it commonly exists in mixtures with other hydrocarbons; principally ethane, propane, butane, and pentanes. Each of these hydrocarbons has a similar size and polarity. Pentane, a larger hydrocarbon, is more easily separated, but for the smaller hydrocarbons, separation is a challenging endeavor.

Most membranes used in the gas separation field are derived from glassy polymers and are generally unacceptable for heavy hydrocarbon separations. Most glassy polymers have high permeation of methane relative to propane, butane, and other gases, and these glassy polymers are not sufficiently selective to discriminate between heavy hydrocarbons and methane. Glassy polymer membranes have been used to effectively separate oxygen and nitrogen in air samples, and have also been used to separate butanol from other biofuels; however, these glassy polymer membranes achieve low hydrocarbon selectivity and thus do not provide sufficient separation for natural gas upgrading applications. In contrast, rubbery polymers, such as polydimethylsiloxane (PDMS), have high permeability, but generally have a lower selectivity. Moreover, the glassy polymer membranes tend to show a decrease in performance due to aging. Aging occurs from collapse of free volume, which tends to cause lower permeability.

SUMMARY

Accordingly, there is a continual need for improved natural gas upgrading membranes which achieve high selectivity, while maintaining suitable permeability, and a long membrane life.

Embodiments of the present disclosure are directed to crosslinked alkoxysilyl polynorbornene homopolymer formulations, methods of making crosslinked alkoxysilyl polynorbornene homopolymer formulations, and methods of membranes incorporating these crosslinked alkoxysilyl norbornene homopolymer formulations, where these norbornene homopolymer membranes demonstrate a high selectivity, suitable permeability, and greater resistance to aging and plasticization, especially in natural gas upgrading applications. Membranes are characteristically subject to tradeoff relationships, where heightened selectivity is accompanied by undesirable decreases in permeability. However, the pendant alkoxylsilyl moieties of the present crosslinked alkoxysilyl polynorbornene homopolymer formulations maintain high permeability while achieving greater selectivities, which is lacking in trimethylsilyl substituted polymers. Further, prior polynorbornenes utilized in natural gas upgrading applications achieve a lower maximum selectivity for propane over methane ($C_3H_8/CH_4$) of 3 under pure gas conditions at 50 psi, whereas the present crosslinked alkoxysilyl norbornene homopolymer membranes may yield at least double that selectivity performance at similar conditions.

In accordance with one embodiment, a method of making a crosslinked alkoxysilyl polynorbornene homopolymer comprising polymerizing a norbornene monomer, having an alkoxysilyl moiety, in the presence of a catalyst to produce an alkoxysilyl modified polynorbornene homopolymer, and producing a crosslinked alkoxysilyl polynorbornene homopolymer through sol-gel initiated crosslinking of the alkoxysilyl modified polynorbornene homopolymer.

In accordance with another embodiment, a formulation comprising a crosslinked alkoxysilyl polynorbornene homopolymer is provided having either of the following structures:

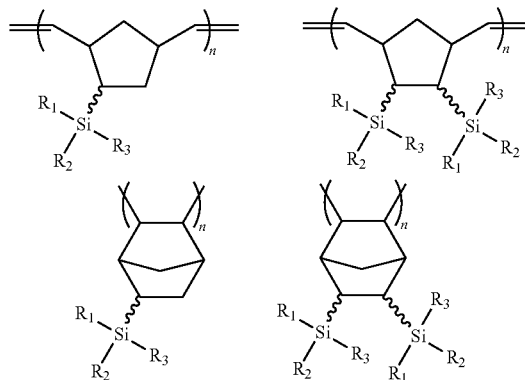

In this case, R1 is an alkyl, an alkoxy, or $OSiR_4R_5$, R2 is an alkyl, an alkoxy, or $OSiR_4R_5$, R3 is an alkyl, an alkoxy, or $OSiR_4R_5$, R4 is an alkyl or an alkoxy, R5 is an alkyl or an alkoxy, and n is at least one, with the requirement that at least one of R1, R2, and R3, is an alkoxy or an alkoxysiloxane, such as $OSiR_4R_5$. Moreover, the cross-linking is characterized by 10% to 100% by weight gel content.

Additional features and advantages of the embodiments will be set forth in the detailed description which follows, and in part will be readily apparent to those skilled in the art that description or recognized by practicing the embodiments described herein, including the detailed description which follows, the claims, as well as the appended drawings.

Figure 1:
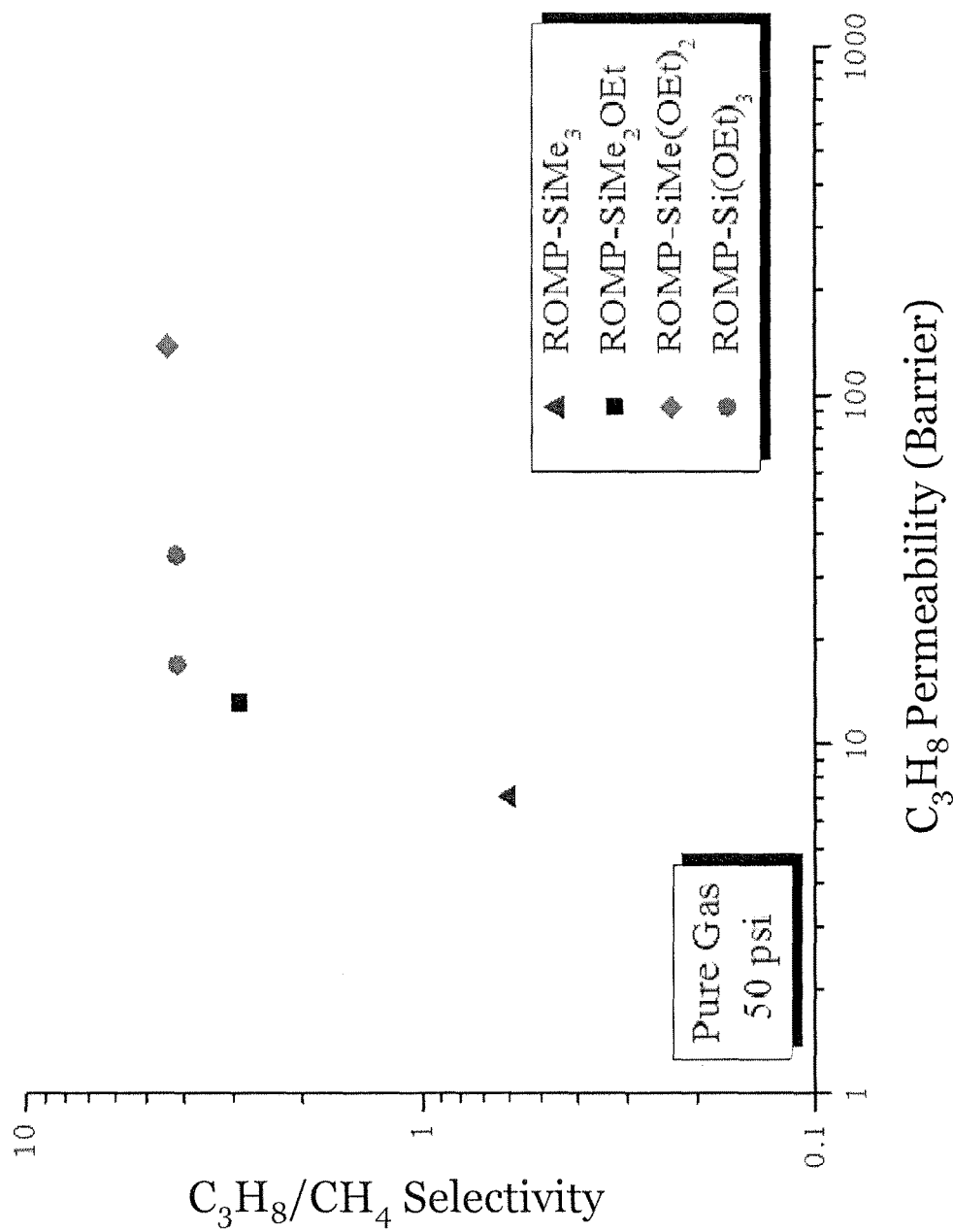
FIG. 1 is a graphical illustration of the selectivity yielded by different crosslinked ethoxysilyl polynorbornene homopolymers [ROMP-SiMe$_2$OEt, ROMP-SiMe(OEt)$_2$, ROMP-Si(OEt)$_3$] produced by ring opening metathesis polymerization (ROMP) in comparison to a non-alkoxylated polynorbornene homopolymer produced by ROMP (ROMP-SiMe$_3$).

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to crosslinked alkoxysilyl polynorbornene homopolymer formulations and membranes including these crosslinked alkoxysilyl polynorbornene homopolymer formulations, where the membranes have improved selectivity separating smaller hydrocarbons, such as methane, ethane, propane and butane, from a heavy hydrocarbon stream.

As used herein, "homopolymer" means that the polymer molecule is produced from only one monomer, specifically the norbornene monomers discussed below, and thus does not encompass copolymers comprising additional comonomers. Though, this work could utilize novel copolymerizations to increase free volume and thus the performance of the resulting membranes. That being said, it is contemplated in some embodiments to blend additional components such as additional polymers or additives with the crosslinked alkoxysilyl polynorbornene homopolymer formulation in the membrane. Such additives could comprise silane small molecule derivatives, which further influence the sol-gel chemistry. Whereas, high engineered additives, such as carbon nanotubes, graphene, or other molecules with metal organic frameworks, would be beneficial in increasing the homopolymer's transport properties.

As used herein, "selectivity" refers to the separation of larger hydrocarbons in comparison to methane. While the following discussion and examples discuss selectivity or propane relative to methane, "selectivity" as used herein may also encompass other larger hydrocarbons such as butane relative to methane. Pure gas selectivity at 50 psi has been as high as 53 for butane to methane, which is substantially higher than propane relative to methane selectivity.

Without being bound by theory, the alkoxysilyl groups of the crosslinked alkoxysilyl polynorbornene homopolymer formulations may provide improved performance to the membrane by increasing the free volume between polymer chains by enhancing steric interactions, as well as promoting gas diffusion due to their high mobility and flexibility. Additionally, the alkoxysilyl containing norbornene polymers are crosslinkable, which offers stabilized performance against aging in long-term applications, while also further increasing the selectivity of the membranes.

Furthermore, increasing the alkoxy content has provided improved selectivity in membranes used in natural gas upgrading, and specifically for the separation of heavy hydrocarbons (ethane, propane, butane) from methane. As described further below, the membrane selectivities of propane to methane may be 8 or higher under pure gas conditions at 50 psi.

The crosslinked alkoxysilyl polynorbornene homopolymer may be produced by polymerizing a norbornene monomer comprising an alkoxysilyl moiety in the presence of a catalyst to produce an alkoxysilyl modified polynorbornene homopolymer. Then, the crosslinked alkoxysilyl polynorbornene homopolymer may be produced through sol-gel initiated crosslinking of the alkoxysilyl modified polynorbornene homopolymer. Various reaction conditions are contemplated for the sol-gel initiated crosslinking. In one or more embodiments, the sol-gel process may be initiated at ambient conditions, or base-catalyzed conditions. For example, the sol-gel initiated crosslinking involves hydrolysis in water or exposure to the atmosphere. Moreover, the degree of crosslinking may be further increased in acid-catalyzed conditions. For example, acids, such as acetic acid, may greatly increase the crosslinking of the alkoxy moieties. While the sol-gel crosslinking of the alkoxysilyl modified polynorbornene homopolymer may be analogized to the crosslinking of ethoxy moieties in a tetraethylorthosilicate (TEOS) compound, it is contemplated that multiple alkoxy alternatives to the ethoxy may be utilized.

In accordance with the present disclosure, the norbornene monomer may comprise one to nine alkoxysilyl groups. For example and not by way of limitation as shown below, the norbornene monomers may include methyldiethoxysilylnorbornene (Structure 1), dimethylethoxysilylnorbornene (Structure 2), and triethoxysilylnorbornene (Structure 3). In some embodiments, more alkoxysilyl substituents may be present. For example, instead of the methyl or alkoxy groups bonded to the silica atom, an alkoxysiloxane substituent may be bonded to the silica atom, (i.e. [OSi(OMe)₃]₃) (Structure 4). Additionally, more than one moiety pay be present on the bicyclic ring structure (Structure 5)

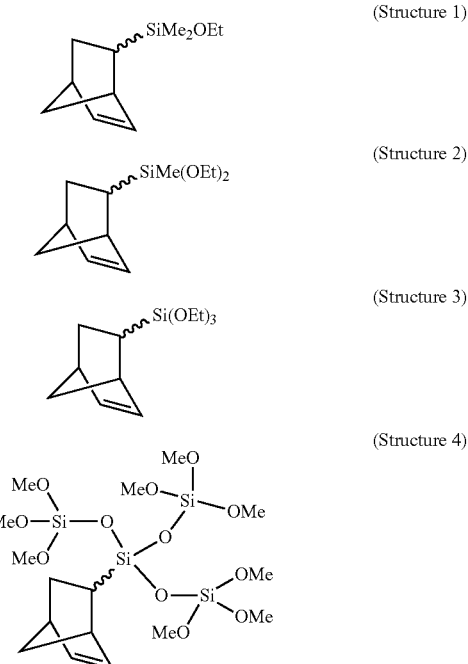

(Structure 5)

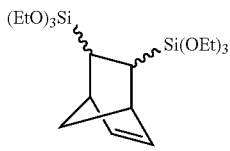

Various polymerization techniques are contemplated. The polymerization technique may include ring-opening metathesis polymerization (ROMP) and addition polymerization as illustrated further as follows.

In another embodiment, the polymerizing step may include a ROMP catalyst. The ROMP catalyst may include a Grubbs catalyst, which is a transition metal complex. In one or more embodiments, the Grubbs catalyst is a Grubbs 1$^{st}$ Generation catalyst, or any later generation of Grubbs catalyst. In one embodiment, the catalyst is a ruthenium catalyst. Optionally, the catalyst may be provided with a carrier or solvent, such as toluene. For example, the ROMP catalyst is a Grubbs 1$^{st}$ Generation catalyst, and may undergo the reaction depicted below.

Below is a sample ROMP Process utilizing triethoxysilylnorbornene monomer (further shown in Structure 3) and a Grubbs 1$^{st}$ Generation catalyst (Benzylidene-bis(tricyclohexylphosphine)dichlororuthenium):

(Reaction 1)

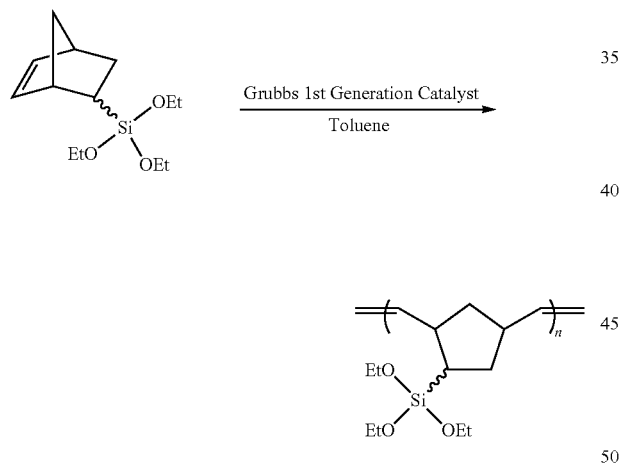

In addition to the triethoxysilyl polynorbornene homopolymer produced in Reaction 1 shown previously, the polynorbornene homopolymer of the ROMP process may have the following structure depicted in Structure 6 as follows:

(Structure 6)

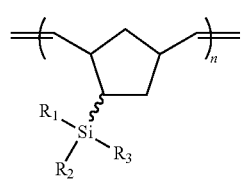

(Structure 7)

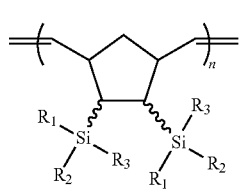

In the alkoxysilyl modified cyclopentane structure of Structure 6 and Structure 7, the R1 is an alkyl, an alkoxy, or OSiR$_4$R$_5$, R2 is an alkyl, an alkoxy, or OSiR$_4$R$_5$, R3 is an alkyl, an alkoxy or OSiR$_4$R$_5$, R4 is an alkyl or an alkoxy, R5 is an alkyl or an alkoxy, and n is at least one, with the requirement that at least one of R1, R2, and R3 is an alkoxy. In further embodiments, at least two and a maximum of all three of R1, R2, and R3 is an alkoxy or an alkoxysiloxane substituent (i.e. OSiR$_4$R$_5$), where the at least two alkoxys comprise the same or a different alkyl moiety.

Various alkoxy groups are contemplated. In one embodiment, alkoxy groups are C$_1$-C$_6$ alkoxy moieties. For example, the alkoxy or alkyoxysiloxane moieties in R1-R3 may include from one to nine of ethoxy groups, methoxy groups, propoxy groups, isopropoxy groups, isobutoxy groups, tert-butoxy groups, or combinations thereof.

For example and not by way of limitation, the polynorbornene homopolymers produced from the ROMP process may include the specific structures depicted as follows: ROMP-SiMe$_2$OEt (Structure 8), ROMP-SiMe(OEt)$_2$ (Structure 9), and ROMP-SiMe(OEt)$_3$, (Structure 10).

(Structure 8)

(Structure 9)

(Structure 10)

Alternatively, the polymerizing step may be an addition polymerization process which utilizes an addition polymerization catalyst to polymerize the alkoxysilyl norbornene monomers. The addition polymerization catalyst may include at least one transition metal catalyst. In one or more embodiments, the transition metal catalyst may comprise nickel, palladium, titanium, zirconium, chromium, vanadium, or combinations thereof. In yet another embodiment, the transition metal catalyst may be a late-transition metal. In one example, the addition polymerization catalyst may be a palladium metallocene catalyst. In further embodiments, the addition polymerization catalyst may be a mixed catalyst comprising the transition metal catalyst and other catalyst components. In one or more embodiments, the addition catalyst may comprise a palladium metallocene catalyst, a trityl borate, and a phosphine. Without being limited to theory, this mixed catalyst is suitable because it has sufficient activity able to overcome the steric bulk of the norbornene monomer. Optionally, the addition catalyst may be mixed in a solvent solution, for example, toluene.

Below is a sample addition polymerization process utilizing triethoxysilylnorbornene monomer (further shown in Structure 3) and a mixed catalyst comprising a palladium metallocene catalyst, a phosphine and a trityl borate.

(Reaction 2)

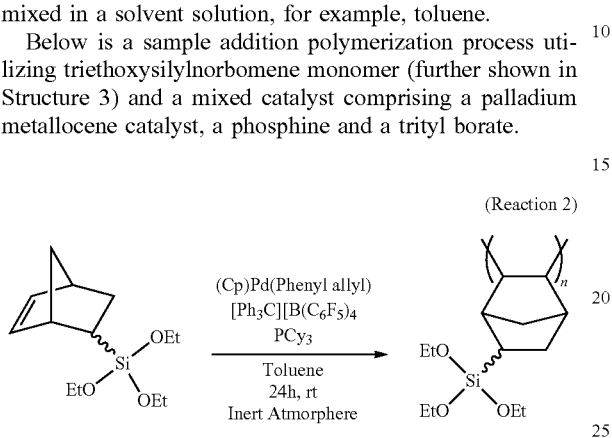

In addition to the triethoxysilyl polynorbornene homopolymer produced in Reaction 2 shown previously, the polynorbornene homopolymer of the additional polymerization process may have the following bicyclic structure depicted in Structure 6 as follows:

(Structure 11)

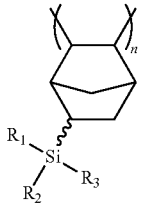

(Structure 12)

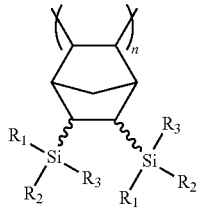

In the alkoxysilyl modified bicyclic structure of Structure 11 and Structure 12, the R1 is an alkyl, an alkoxy, or OSiR4R5, R2 is an alkyl, an alkoxy, or OSiR4R5, R3 is an alkyl, an alkoxy, or OSiR4R5, R4 is an alkyl or an alkoxy, R5 is an alkyl or an alkoxy, and n is at least one, with the requirement that at least one of R1, R2, and R3 is an alkoxy or alkoxysiloxane. In further embodiments, at least two of R1, R2, R3, R4 and R5 is an alkoxy or an alkoxysiloxane substituent (similar to moiety in Structure 4), where at least two alkoxy groups comprise the same or a different alkyl moiety.

For example and not by way of limitation, the alkoxylsilyl polynorbornene homopolymers produced from the additional polymerization process may include the specific structures depicted as follows: APN-SiMe$_2$OEt (Structure 13), APN-SiMe(OEt)$_2$ (Structure 14), and APN-Si(OEt)$_3$ (Structure 15).

(Structure 13)

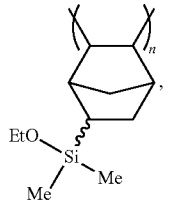

(Structure 14)

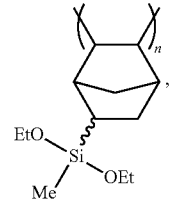

(Structure 15)

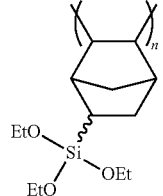

While the structure of alkoxysilyl polynorbornene homopolymers differ slightly when produced by ROMP or APN, the alkoxysilyl moiety is common to both. In one or more embodiments, the alkoxysilyl polynorbornene homopolymer chain may include from 10% by weight to 80% by weight alkoxy, or from 15 to 75% by weight alkoxy, or from 20% to 60 by weight alkoxy depending on the number of alkoxy moieties attached to the silicon.

In one or more embodiments, the crosslinked alkoxysilyl polynorbornene homopolymer may comprise a molecular weight distribution (MWD) from 1 to 3, where MWD is defined as Mw/Mn with Mw being a weight average molecular weight and Mn being a number average molecular weight. In further embodiments, the crosslinked alkoxysilyl polynorbornene homopolymer may include an MWD from 1 to 2.

Figure 5:
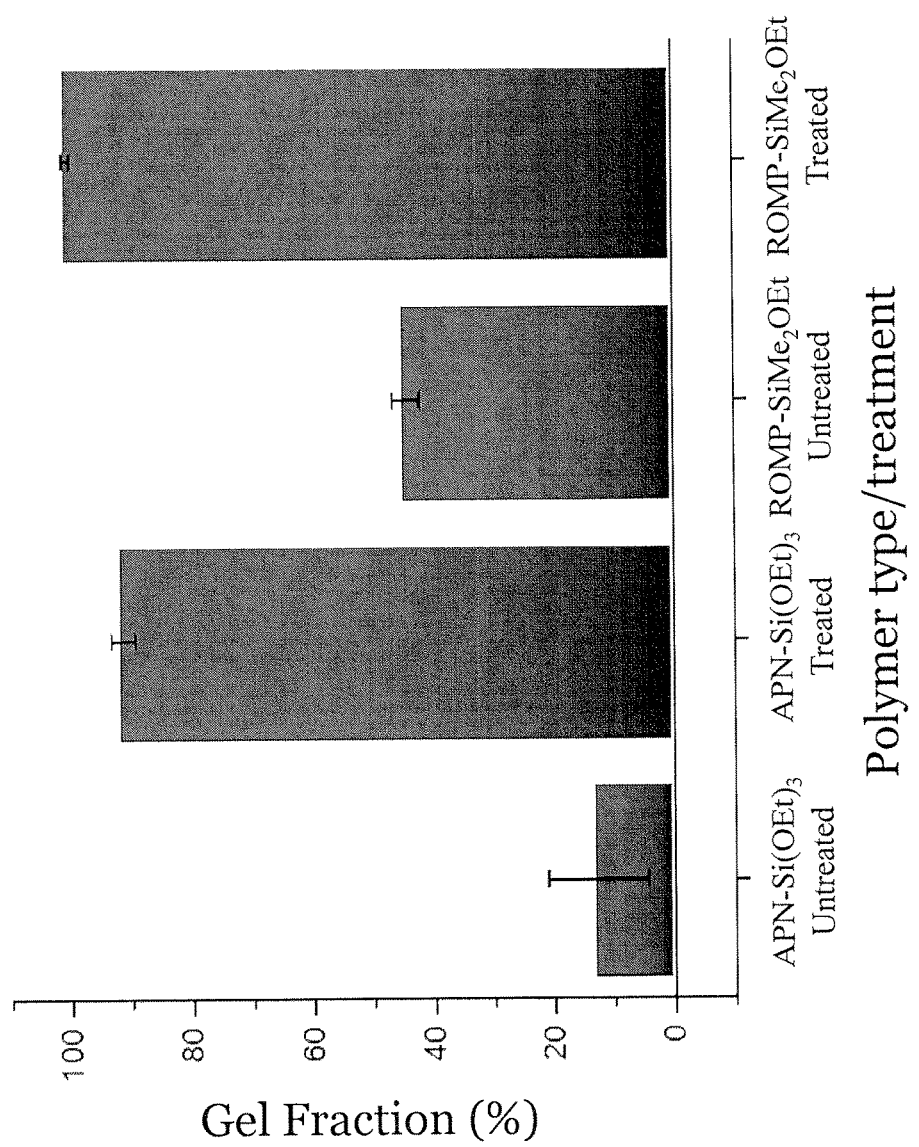
FIG. 5 is a bar chart depicting the increase in gel fraction (%) and crosslinking in APN or ROMP, when further conducting the sol-gel initiated crosslinking in acid catalyzed conditions, in this case acetic acid.

As stated previously, the alkoxysilyl groups of the alkoxylsilyl polynorbornene homopolymers have controllable crosslinking functionalities. Without being limited to theory, crosslinking may often occur prematurely during synthesis, resulting in polymers that cannot be processed into membrane form. However, the crosslinking of the present alkoxylsilyl polynorbornene homopolymer embodiments may be controlled such the alkoxylsilyl polynorbornene homopolymer is synthesized, precipitated, and cast into film form before crosslinking occurs. As stated previously, crosslinking occurs in the final film state by exposure to water or, in some cases, prolonged exposure to atmosphere in ambient conditions. Referring to FIG. 5, the degree of crosslinking when the alkoxylsilyl polynorbornene homopolymer is treated with an acid, such as acetic acid. In one or more embodiments, the crosslinking of the crosslinked alkoxysilyl polynorbornene homopolymer may be characterized by 10% to 100% by weight gel content, or 20 to 100% by weight gel content.

As stated previously, one of the key features of the present membrane is higher selectivity between heavy hydrocarbons and methane. In order for a membrane to be effective at separating small molecules, the pore sizes in the membrane must be controlled as well. Gas permeation studies were used to determine the selectivity. Pure gas permeability coefficients were measured using a constant volume, variable pressure technique. The upstream side of the membrane was constructed using stainless-steel Swagelok® tubing and tube fittings. The downstream side consisted of mostly welded Swagelok® tubing and VCR fittings. A stainless-steel, high pressure filter holder (Millipore, Billerica, Mass.) was used to house the membrane. Permeability measurements were taken using a feed pressure between 50-100 psi at room temperature (23-25° C.). The downstream, or permeate pressure, was maintained at less than 50 Torr. Establishment of permeation steady-state was verified using the time-lag method, where 14× the diffusion time-lag was taken as the effective steady-state. System pressure was measured using Baratron absolute pressure transducers (MKS Instruments, Billerica Mass.) and recorded using Labview Software.

The permeability coefficient is defined as the transport flux of material through the membrane per unit driving force per unit membrane thickness. The membrane thickness can range from 50 to 150 microns. The membrane thickness can be significantly lower and can be less than 1 micron. The pure gas permeability coefficients are calculated using a constant volume/variable pressure technique. The permeability coefficient is calculated using the following equation:

$$P_i = (n_i * l)/\Delta f \quad \text{(Equation 1)}$$

Where n is the molar flux, l is the membrane thickness and $\Delta f$ is the fugacity difference across the membrane. Using a fugacity difference, rather than a partial pressure difference, accounts for gas phase non-idealities in the feed stream, which can significantly affect the permeability values of hydrocarbon gases. Fugacity coefficients are calculated using the Peng-Robinson equation of state. Ideal selectivity was calculated by the following equation:

$$\alpha = P_i/P_j \quad \text{(Equation 2)}$$

Figure 2:
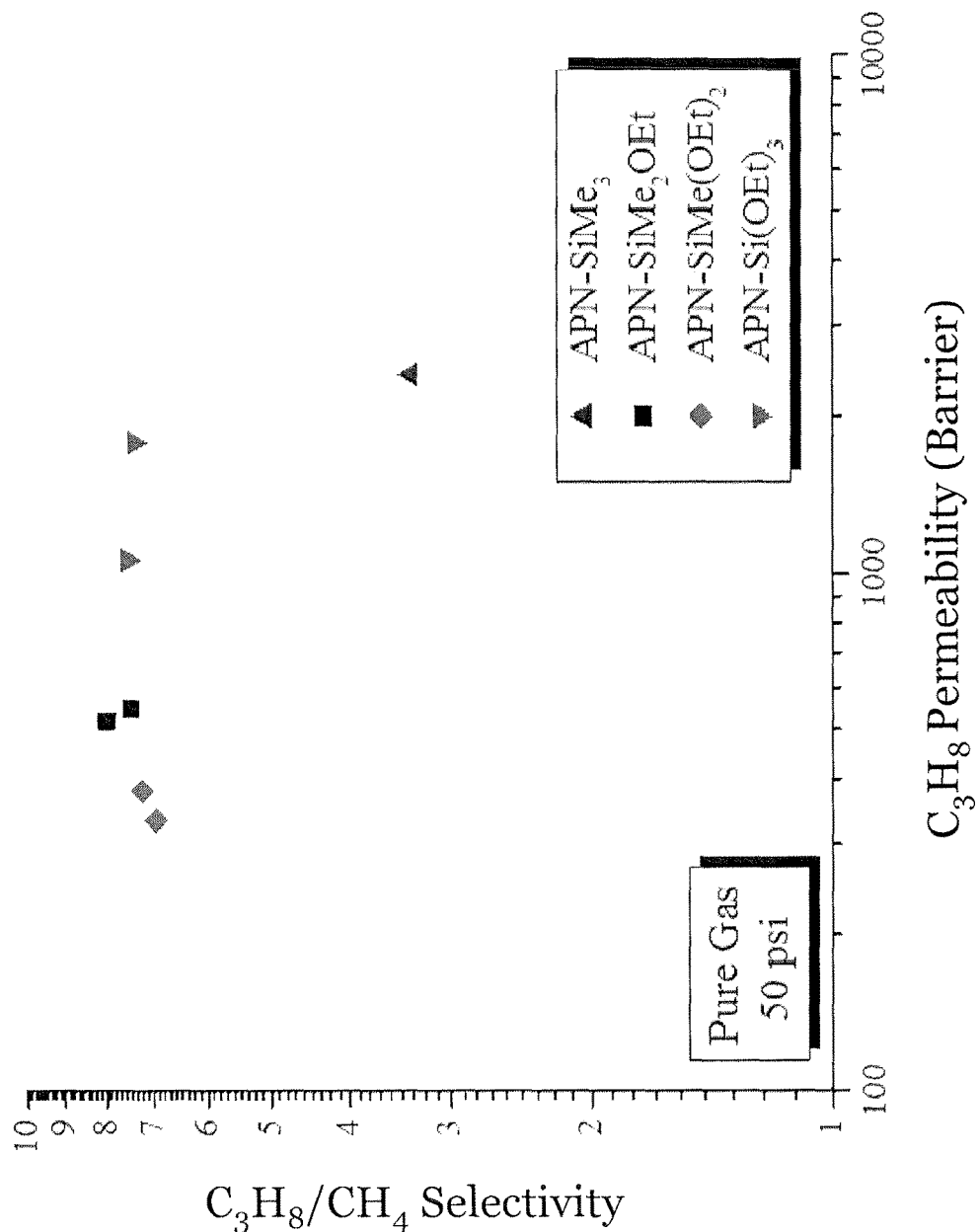
FIG. 2 is a graphical illustration of the selectivity yielded by different crosslinked ethoxysilyl polynorbornene homopolymers [APN-SiMe$_2$OEt, APN-SiMe(OEt)$_2$, APN-Si(OEt)$_3$] produced by addition polymerization (APN) in comparison to a non-alkoxylated polynorbornene homopolymer produced by APN (APN-SiMe$_3$).

As shown in FIG. 1, the addition polymerized alkoxysilyl polynorbornene homopolymers [APN-SiMe$_2$OEt, APN-SiMe(OEt)$_2$, APN-Si(OEt)$_3$] all achieve propane/methane selectivity between about 6 to about 9 under pure gas conditions at 50 psi, with most alkoxysilyl polynorbornenes achieving a selectivity of about 7 to about 8. In contrast, the addition polymerized polynorbornene without an alkoxy (APN-SiMe$_3$) achieved a selectivity of only about 3. Referring to FIG. 2, while ROMP alkoxysilyl polynorbornene homopolymers [ROMP-SiMe$_2$OEt, ROMP-SiMe(OEt)$_2$, ROMP-Si(OEt)$_3$] achieve lower selectivity than the addition polymerized alkoxysilyl polynorbornene homopolymers [APN-SiMe$_2$OEt, APN-SiMe(OEt)$_2$, APN-Si(OEt)$_3$] of FIG. 1, the selectivity is at least 3 times the selectivity of the ROMP polynorbornene homopolymers without an alkoxy (ROMP-SiMe$_3$).

As stated previously, selectivity correlates at least in part to interchain packing. Wide Angle X-ray Diffraction (WAXRD) is most often used in the analysis of crystalline small molecules and crystalline polymers. Most useful membranes in gas separations are largely amorphous and therefore few studies relate the data obtained in WAXRD patterns to permeation properties. However, by relating the scattering angle to interchain distances via Bragg's law, the interchain distances may calculated from the WAXRD peaks shown (denoted by asterisks above the peak in FIGS. 3 and 4.

Interchain distances are denoted as $(d_B/d_{ic})$=(Bragg's distance/interchain correction distance)=$([\lambda/2 \sin \theta]/[1.22\lambda/2 \sin \theta])$.

Figure 3:
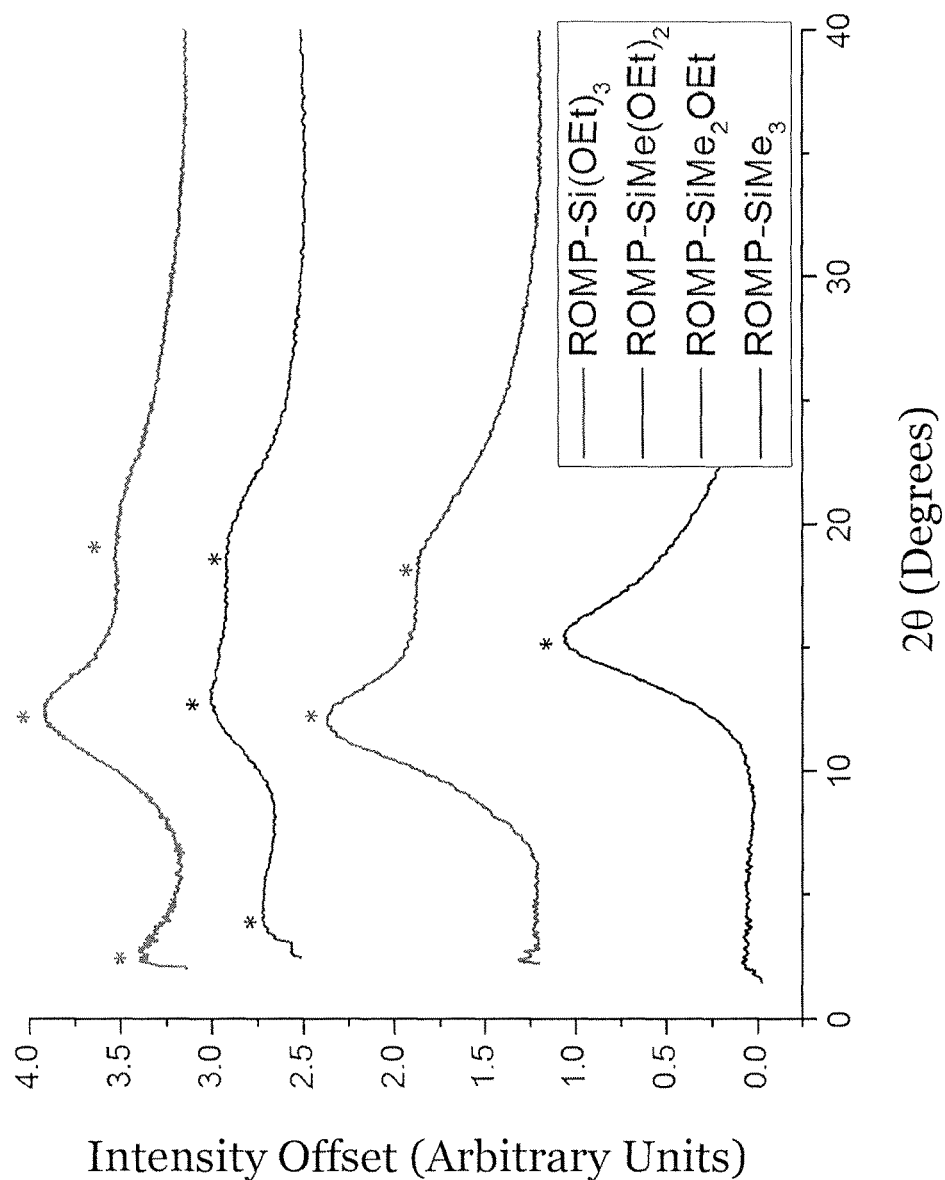
FIG. 3 is a graphical illustration of Wide Angle X-Ray Diffraction (WAXRD) patterns of different crosslinked ethoxysilyl polynorbornene homopolymers [ROMP-SiMe$_2$OEt, ROMP-SiMe(OEt)$_2$, ROMP-Si(OEt)$_3$] produced by ring opening metathesis polymerization (ROMP) in comparison to a non-alkoxylated polynorbornene homopolymer produced by ROMP (ROMP-SiMe₃).
Figure 4:
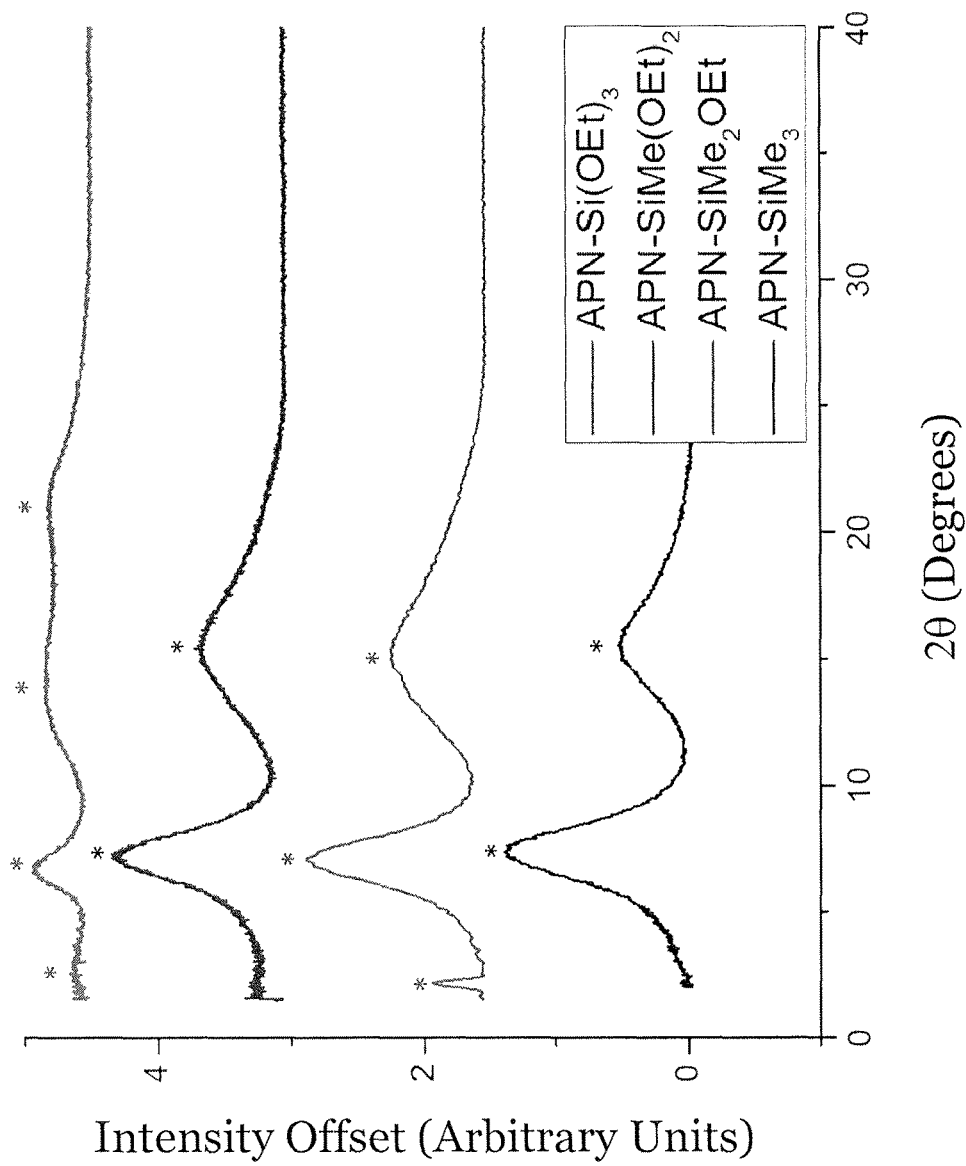
FIG. 4 is a is a graphical illustration of WAXRD patterns of different crosslinked ethoxysilyl polynorbornene homopolymers [APN-SiMe₂OEt, APN-SiMe(OEt)₂, APN-Si(OEt)₃] produced by addition polymerization (APN) in comparison to a non-alkoxylated polynorbornene homopolymer produced by APN (APN-SiMe₃).

Referring for illustration to the embodiments of FIGS. 3 and 4, the crosslinked alkoxysilyl polynorbornene homopolymers include at least a first chain packing region and a second chain packing region (illustrated by asterisks), where the first chain packing region is defined by a first interchain distance and the second chain packing region is defined by a second interchain distance, the first interchain distance being smaller than the second interchain distance, where the first interchain distance and second interchain distance are calculated from Bragg's Law for angle peaks measured by WAXRD. In another embodiment, the crosslinked alkoxysilyl polynorbornene homopolymers may further comprise a third packing region defined by a third interchain distance, the third interchain distance being larger than the first interchain distance and second interchain distance. In yet another embodiment, the crosslinked alkoxysilyl polynorbornene homopolymers may further comprise a fourth packing region defined by a fourth interchain distance, the fourth interchain distance being smaller than the first, second, and third interchain distances.

The features of the present embodiments will be further illustrated in the Examples which follow.

Examples

Ring-Opening Metathesis Polymerization Triethoxysilylnorbornene (ROMP-Si(OEt)$_3$ Synthesis Referring to Reaction 1 for illustration, in a glovebox, a 30 milliliter (mL) vial was charged with 03.85 g of as received triethoxysilylnorbornene (0.05 molar (M), 1.51 millimoles (mmol)) and 29 mL of dry deoxygenated toluene. In a separate vial, 2.5 milligrams (mg) of Grubb's first generation catalyst, containing Ruthenium, (0.003 mmol) was dissolved in 2 mL of dry toluene to create a stock catalyst solution. Finally, 1.0 mL of the catalyst solution was added to the stirring norbornene solution to initiate polymerization. After 24 hours ethyl vinyl ether (0.431 mL, 4.51 mmol) was added to terminate the polymerization, and the solution continued to stir. After another 24 hours, the solvent was removed under vacuum in the glovebox until the sample volume was approximately 5 mL, where the sample became a viscous liquid. The viscous solution was precipitated dropwise into stirring alcohol (500 mL). Upon precipitation a fibrous polymer was obtained in a cloudy supernatant. The polymer was dried to constant weight and isolated as an off-white solid.

Addition Polymerization Triethoxysilylnorbornene (APN-Si(OEt)$_3$) Synthesis:

Referring to Reaction 2 for illustration, under nitrogen, a 30 mL vial was charged with 1.541 g of as received triethoxysilylnorbornene (6.01 mmol) and 29.7 mL of dry, deoxygenated toluene (0.2 M). In three separate vials, 0.34 mg tricyclohexylphosphine (00012 mmol) was dissolved in 1 mL of toluene, while 0.35 mg of cyclopentadienyl-(1,2,3-n)-1-phenyl-2-propenyl palladium (II) (0.0012 mmol) was dissolved in 1 mL of toluene, and 1.11 mg trityl tetrakis

[3,5-bis(trifluoromethyl)phenyl]borate (0.0012 mmol) was dissolved in 1 mL of toluene. 0.2 mL of the solution containing the palladium catalyst was mixed with 0.2 mL of the phosphine solution, and then 0.2 mL of the trityl borate solution was added to the 0.4 mL of palladium and phosphine. Afterwards, 0.3 mL of the mixed catalyst solution was added to the norbornene solution. The reaction vessel was sealed and brought out of the glove box to heat and stir at 40 degrees Celsius (C) for 24 hour, where it became yellow and viscous. After 24 hours, the solution was precipitated in 1000 mL of acetone dropwise, which immediately formed small white polymer beads stirring in the acetone. The white polymer was collected via filtration and dried under reduced pressure at room temperature.

Addition Polymerization Triethoxysilylnorbornene (APN-Si(OEt)$_3$) Casting:

A 0.5 gram (g) sample of triethoxy polymer was dissolved in 10 mL of toluene and stirred until completely dissolved. The solution was then filtered with a 0.45 microliter (4) syringe filters under dry, inert conditions in a glovebox. A 10 mL filtered polymer solution with a 5 w/v % concentration was poured into a 10 centimeter (cm) diameter PFA mold on a level surface. The PFA mold was covered to slow the rate of evaporation, and the film was allowed to dry overnight. Polymer film was removed from the PFA mold and dried to constant weight under vacuum. The obtained films were transparent, ductile and colorless.

large distant chain-packing region as (13.6/16.6) Å, which was calculated under Bragg's law to be (12.0/14.6) Å. This loose chain-packing accounts for the lack of diffusivity-selectivity in the addition-type polymers. The low scattering angle peak generally shifted to even lower angles as a function of increasing ethoxy substitution, finally reaching (13.4/16.3) Å in the APN-Si(OEt)$_3$ polymer. One notable exception in this trend was that APN-SiMe(OEt)$_2$ (12.4/15.1) actually had increased chain-packing compared to APN-SiMe$_2$OEt (12.5/15.3) Å. This unexpected difference may account for the unique transport properties showing that APN-SiMe$_2$OEt is a more permeable material than APN-SiMe(OEt)$_2$.

Two of the polymers, APN-SiMe$_2$OEt and APN-Si(OEt)$_3$ also showed a third region of very low scattering angle, which corresponds to very distant interchain packing. These peaks represent spacing as large as (40.9/49.9) Å and may be crucial in retaining high permeabilities at heightened selectivities. One of the polymers, APN-Si(OEt)$_3$, also showed a fourth peak of very tight interchain packing (4.2/5.1) Å that provides evidence of crosslinking in the addition-polymer with the most ethoxy content. Only one addition-type polymer displays this shift compared to three of the ROMP polymers. The higher glass transitions of the addition-type polymers restricts chain mobility and limit the ability of crosslinking sites to react together when compared with the lower T$_g$ ROMP polymers.

TABLE 1

| Polymer | $(2\theta)_1$, deg | $(d_B/d_{ic})_1$ | $(2\theta)_2$, deg | $(d_B/d_{ic})_2$ | $(2\theta)_3$, deg | $(d_B/d_{ic})_3$ | $(2\theta)_4$, deg | $(d_B/d_{ic})_4$ |
|---|---|---|---|---|---|---|---|---|
| ROMP-SiMe$_3$ | — | — | — | — | 15.5 | 5.7/7.0 | — | — |
| ROMP-SiMe$_2$OEt | — | — | — | — | 12.3 | 7.2/8.8 | 18.4 | 4.8/5.9 |
| ROMP-SiMe$_2$(OEt)$_2$ | 4.3 | 20.4/24.9 | — | — | 13.3 | 6.7/8.2 | 16.9 | 5.2/6.3 |
| ROMP-Si(OEt)$_3$ | 2.7 | 32.4/39.5 | — | — | 12.4 | 7.1/8.7 | 18.6 | 4.8/5.9 |
| APN-SiMe$_3$ | — | — | 7.4 | 12.0/14.6 | 15.5 | 5.7/7.0 | — | — |
| APN-SiMe$_3$ (Finkelshtein et. al) | — | — | 6.5 | 13.6/16.6 | 15.5 | 5.7/7.0 | — | — |
| APN-SiMe$_2$OEt | 2.2 | 40.9/49.9 | 7.1 | 12.5/15.3 | 15.4 | 5.8/7.1 | — | — |
| APN-SiMe(OEt)$_2$ | — | — | 7.1 | 12.4/15.1 | 15.4 | 5.7/7.0 | — | — |
| APN-Si(OEt)$_3$ | 2.5 | 34.9/42.6 | 6.6 | 13.4/16.3 | 13.9 | 6.4/7.8 | 21.0 | 4.2/5.1 |

Referring to FIG. 4 and Table 1 above, ROMP-SiMe$_3$ shows only one peak representing a chain packing of (5.7/7.0) A, which while relatively high is consistent with many diffusion controlled gas separation membranes such as polysulfone or polyimide. Upon ethoxy substitution this peak starts to broaden out in ROMP-SiMe$_2$OEt to form two peaks equaling (7.2/8.8) Å and (4.8/5.9) Å. This larger interchain peak is indicative of the high free volume between polymer chains, which allows for solubility-controlled permeation since the chain packing is too large to effectively discriminate between gas molecules. The smaller interchain peak may arise due to the crosslinking of the ethoxy-containing polymers, which is a mechanism for closer packing between polymer chains.

This trend also continues in ROMP-SiMe(OEt)$_2$ and ROMP-Si(OEt)$_3$, although in these two polymers a third region of very loose chain packing begins to emerge, (20.4/24.9) Å and (32.4/39.5) Å respectively. It is assumed that these regions will even further promote the loss of diffusivity-controlled selectivity and the emergence of solubility-controlled selectivity.

Referring to FIG. 3 and Table 1 above, the methyl-substituted polynorbornene APN-SiMe$_3$ is already known in the literature to be a solubility-selective material. This polymer has a bimodal chain packing distribution with a It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A method of making a crosslinked alkoxysilyl polynorbornene homopolymer comprising:
   polymerizing a norbornene monomer comprising at least one alkoxysilyl moiety in the presence of a catalyst to produce an alkoxysilyl modified polynorbornene homopolymer, and
   producing a crosslinked alkoxysilyl polynorbornene homopolymer through sol-gel initiated crosslinking of the alkoxysilyl modified polynorbornene homopolymer at ambient conditions, acid-catalyzed, or base-catalyzed conditions.

2. The method of claim 1, where the polymerizing step comprises an addition polymerization process, which utilizes a transition metal catalyst.

3. The method of claim 2, where the transition metal catalyst comprises a palladium metallocene derivative catalyst.

4. The method of claim 3, further comprising a trityl borate, a phosphine, or combinations thereof.

5. The method of claim 1, where the polymerizing step comprises a ring opening metathesis polymerizing (ROMP) process, which utilizes a Grubbs 1$^{st}$ Generation catalyst, or any later generation of Grubbs catalyst.

6. The method of claim 1, where the alkoxysilyl moiety includes from one to eighteen alkoxy groups.

7. The method of claim 1, where the crosslinked alkoxysilyl polynorbornene homopolymer has either of the following structures:

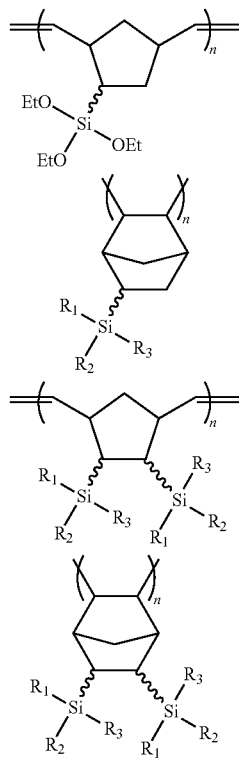

where R1 is an alkyl, an alkoxy, or alkoxysiloxane, R2 is an alkyl, an alkoxy, or alkoxysiloxane, R3 is an alkyl, an alkoxy, or alkoxysiloxane, and n is at least one, where at least one of R1, R2, and R3, is an alkoxy or alkoxysiloxane.

8. The method of claim 7 where at least two of R1, R2, and R3 is an alkoxy or an alkoxysiloxane, where at least two alkoxys are the same or a different moiety.

9. The method of claim 1 where the norbornene monomer comprises methyldiethoxysilylnorbornene, dimethylethoxysilylnorbornene, or triethoxysilylnorbornene.

10. The method claim 1, where the sol-gel initiated crosslinking involves hydrolysis in water or exposure to the atmosphere.

11. The method claim 10, where the sol-gel initiated crosslinking is acid or base catalyzed.

12. The method of claim 1, where the degree of crosslinking is measured by gel content, and has about 10% to about 100% by weight gel content.

13. A formulation comprising a crosslinked alkoxysilyl polynorbornene homopolymer having either of the following structures:

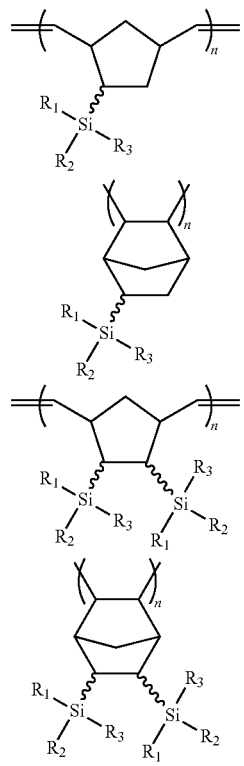

where R1 is an alkyl, an alkoxy, or alkoxysiloxane, R2 is an alkyl, an alkoxy, or alkoxysiloxane, R3 is an alkyl, an alkoxy, or alkoxysiloxane, and n is at least one, where at least one of R1, R2, and R3, is an alkoxy or alkoxysiloxane; and
where the cross-linking is characterized by 10% to 100% by weight gel content.

14. The formulation according to claim 13 where the crosslinked alkoxysilyl polynorbornene homopolymer includes at least a first chain packing region and a second chain packing region, where the first chain packing region is defined by a first interchain distance and the second chain packing region is defined by a second interchain distance, the first interchain distance being smaller than the second interchain distance, where the first interchain distance and second interchain distance are calculated from Bragg's Law for angle peaks measured by Wide Angle X-ray diffraction (WAXRD).

15. The formulation according to claim 14, further comprising a third packing region defined by a third interchain distance, the third interchain distance being larger than the first interchain distance and second interchain distance, where the third interchain distance is calculated from Bragg's Law for angle peaks measured by WAXRD.

16. The formulation according to claim 15, further comprising a fourth packing region defined by a fourth interchain distance, the fourth interchain distance being smaller than the first, second, and third interchain distances, where the fourth interchain distance is calculated from Bragg's Law for angle peaks measured by WAXRD.

17. The formulation according to claim 13, where the crosslinked alkoxysilyl polynorbornene homopolymer comprises a molecular weight distribution (MWD) from 1 to 3, where MWD is defined as $M_w/M_n$ with $M_w$ being a weight average molecular weight and $M_n$ being a number average molecular weight.

18. A natural gas separation membrane comprising the formulation of claim 13.

\* \* \* \* \*